April 19, 1966  J. B. HOLMES  3,246,755
APPARATUS FOR WASHING, GRADING AND DEWATERING LOOSE MATERIAL
Filed May 7, 1962  5 Sheets-Sheet 3

INVENTOR.
JOHN B. HOLMES,
BY
his ATTORNEY.

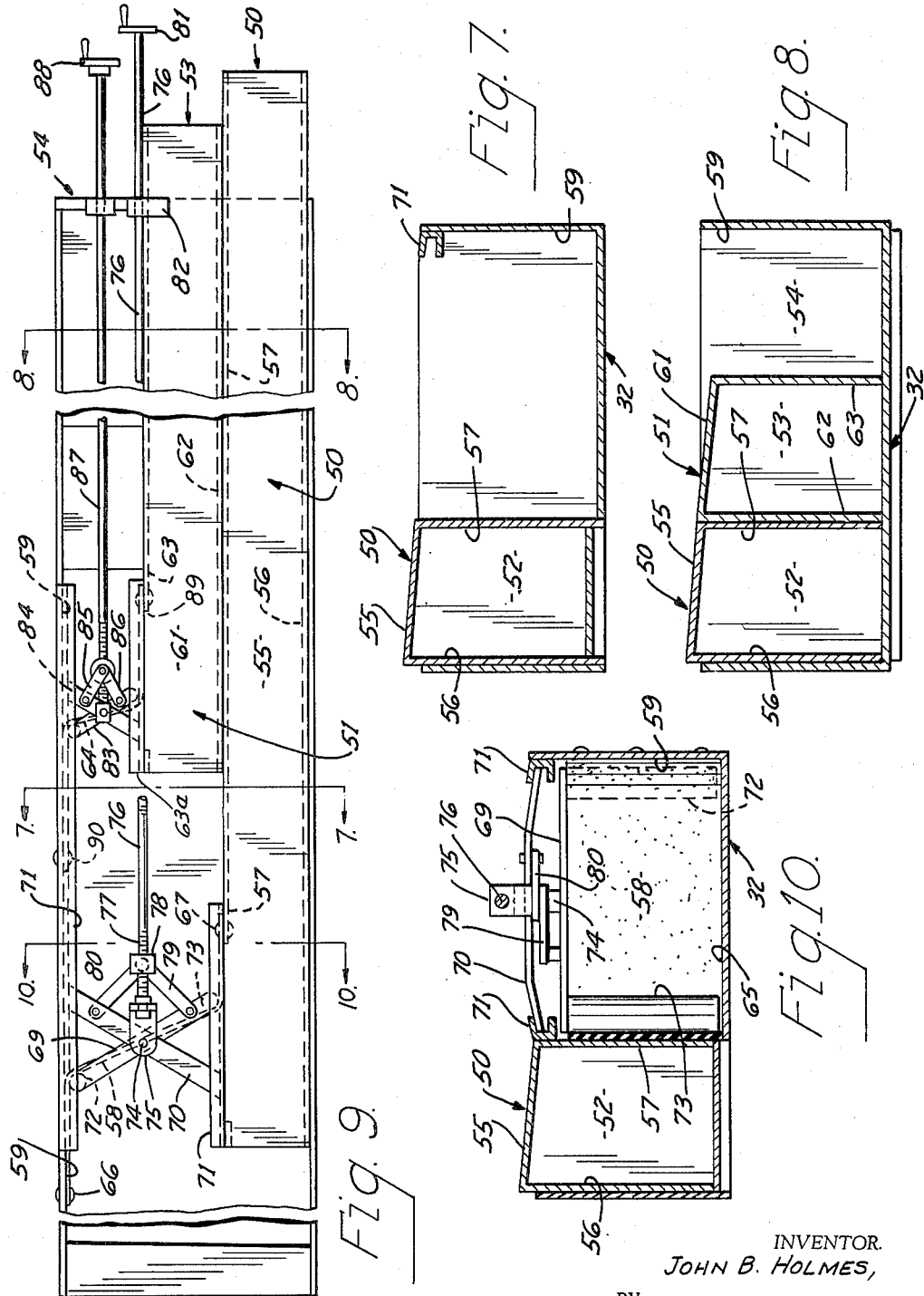

April 19, 1966  J. B. HOLMES  3,246,755
APPARATUS FOR WASHING, GRADING AND DEWATERING LOOSE MATERIAL
Filed May 7, 1962  5 Sheets-Sheet 5

INVENTOR.
JOHN B. HOLMES,
BY
his ATTORNEY.

3,246,755
APPARATUS FOR WASHING, GRADING AND DEWATERING LOOSE MATERIAL
John B. Holmes, R.D. 1, Burton, Ohio
Filed May 7, 1962, Ser. No. 192,933
11 Claims. (Cl. 209—442)

This invention relates to an apparatus for washing loose material with liquid and for removing or separating the material from the washing liquid, and is an improvement in the apparatus disclosed in my copending application, Serial No. 86,167, filed January 31, 1961, and entitled "Combined Washer, Separator and Grader for Loose Materials," now Patent No. 3,042,208, issued July 3, 1962.

For the purposes of illustration, the invention will be described as applied to the washing of bank run sand with water, its use in connection with other loose materials and liquids being readily apparent from the illustrative example.

The principal object of the invention is to separate loose materials more effectively from the washing liquid and its suspended matter so as not only to remove more of the liquid and leave the material in a cleaner and drier condition at the time of discharge, but also to remove the liquid from the upper surface of the material so that the liquid is not filtered by the material but the material passes in loose condition through the liquid and settles out of the liquid.

A more specific object is to provide better control of the amount and size of fines removed by the washing water by control of the velocity of flow of the washing water being discharged from the washing equipment.

Another specific object is to provide a more simple and effective adjustable grading deflector for grading the sand or loose material, as it is conveyed from the washing site to the point of discharge, preparatory to its discharge.

Various other objects and advantages of the present invention will become apparent from the following description, wherein reference is made to the drawings, in which:

FIG. 5 is a vertical longitudinal sectional view through the apparatus and is taken on the line 5—5 in FIG. 1;

Figure 6:
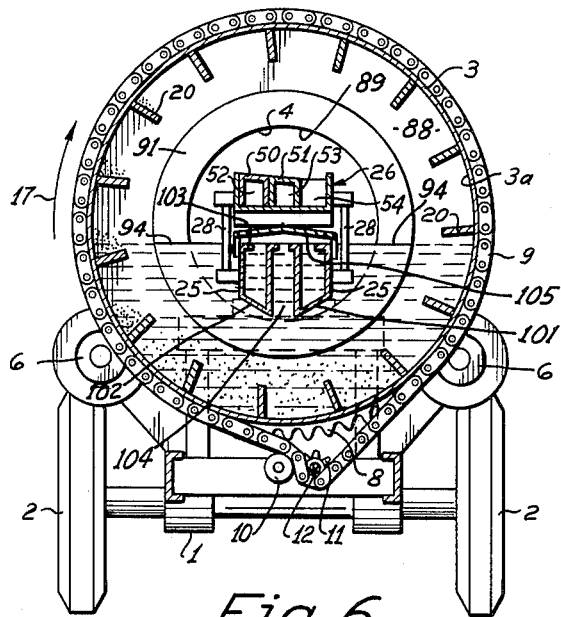
FIG. 6 is a vertical cross sectional view and is taken on the line 6—6 in FIG. 2.
Figure 11:
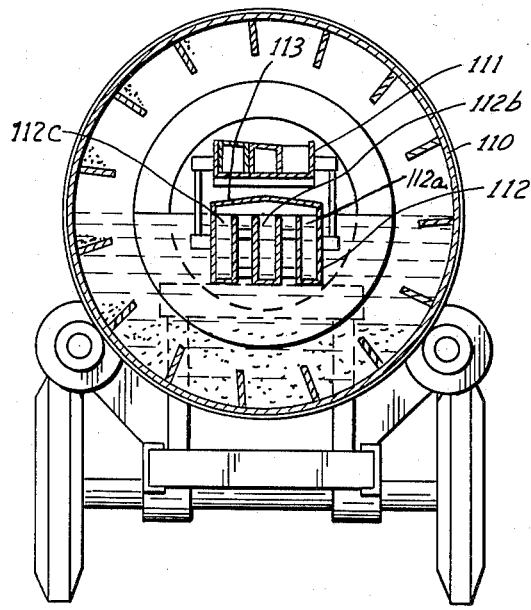

FIGS. 7 and 8 are enlarged fragmentary cross sectional views of the trough of the conveyor and are taken on lines 7—7 and 8—8, respectively, of FIG. 9;

FIG. 9 is an enlarged fragmentary top plan view of the conveyor, showing the adjustable grading deflections of the present invention;

FIG. 10 is a further fragmentary enlarged vertical sectional view, taken on the line 9—9 in FIG. 7; and FIG. 11 is a vertical cross sectional view, similar to FIG. 6, showing a modification of the invention.

Referring to the drawings, the apparatus comprises a suitable supporting frame 1 which is mounted on wheels 2 so as to be readily transportable. Mounted on the frame 1 is a rotatable drum 3 having an imperforate peripheral wall 3a and having an inlet opening 4 at one end and a discharge opening 5 at the opposite end. The drum is arranged with its axis horizontal.

Figure 4:
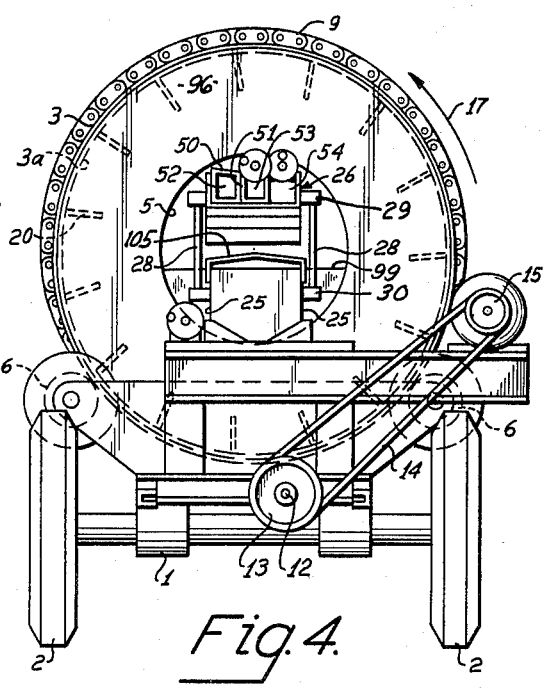

For supporting the drum for rotation about its axis, a plurality of rollers 6 are mounted on the support and engage suitable circumferential tracks 7 on, and near the ends of, the drum. For rotating the drum about its axis, the drum is provided with a sprocket 8 which is drivingly connected to a chain 9. The chain 9 passes over an idler roll 10 to a driving sprocket 11 which is mounted on a suitable shaft 12 carried on the frame. The shaft carries a driving pulley 13 which is driven through a suitable belt 14 by a driving pulley 15. The driving pulley 15 is driven through a suitable gear reduction and motor mechanism 16. Thus the drum is rotated unidirectionally, as indicated by the arrow 17 in FIG. 4.

A suitable feed pipe 18 introduces the mixture of water and sand from a hopper H into the inlet end 4 of the drum. A discharge chute 19 is provided for receiving the sand from the drum and discharging it, as will later be described.

Arranged within the drum is a plurality of imperforate paddles 20 which extend longitudinally of the drum and at an angle to the peripheral wall 3a of the drum. At the ends, the spaces between them and the drum wall are closed so that, on the rising side of the drum, they act as upwardly open imperforate walled troughs or buckets for conveying the mixture of water and sand upwardly from the bottom of the drum. As they rise, the sand settles out of the water and the water is decanted by pouring it off the surface of the settled-out sand. The sand and gravel they discharge contains residual water only. They drop the mixture of sand and residual water downwardly after they reach a predetermined elevation and tilted position.

Disposed within the drum and extending from the inlet end thereof outwardly and beyond the discharge end, is a combined conveyor, separator, and dehydrator, hereinafter referred to as the conveyor. The conveyor comprises a frame in the form of a pair of longitudinal sills 25 on which is supported an upwardly open trough 26 which extends through the drum adjacent the axis thereof. The trough 26 is arranged to receive materials discharged from the buckets as they reach the upper part of their path of rotation about the axis of the drum. For this purpose, it is preferably open at the top throughout that portion of its length along which material is to be discharged from the buckets, thus giving a very simple and direct feed of the sand and residual water into the trough. However, if desired, suitable grading means in the form of deflectors or chutes may be provided along the length of the drum for receiving the sand discharged from the buckets and, in turn, discharging it into the trough, as later described herein.

Usually, the water level in the drum is such that the sand is completely immersed in water and is picked up with the water at the bottom of the drum by the buckets. As it is lifted thereby, the sand settles in loose condition through the water. The excess water is decanted by pouring it off the top of the sand as the buckets tilt, and drops back into the drum. The decanting is gradual as the buckets rise and become tilted at an increasingly greater angle to the horizontal.

The trough 26 is arranged so that this decanted initial free water does not fall into it, but passes in a path outside of the trough back into the drum. In the form illustrated, this is done by using a trough 26 which is relatively narrow in a direction transversely of the drum and positioning it so that its side adjacent to the upward travelling side of the drum is spaced sufficiently far away therefrom so that the water pouring out of the buckets passes back into the drum in the space between the rising buckets and the trough.

As the buckets approach more nearly an inverted position at the top of the drum, the sand and residual water fall into the trough wherein the conveying operation and further removal of water are effected.

The trough 26 extends from one end of the drum to and outwardly beyond the other end of the drum, as indicated at 27, so that it can discharge into the chute 19.

The trough preferably is arranged so that its bottom wall as a whole slopes upwardly at a slight angle in a direction toward the discharge end of the trough 26. Thus, as the sand is moved upwardly along the trough, any water separated therefrom onto the top of the sand tends to drain back along the trough in a direction toward the lower end of the trough. A considerable amount of residual water remains in the sand when it is deposited on the trough so that, if it were separated and not drained from the trough, a substantial flow rearwardly or toward the lower end of the trough would result. This would wash a large amount of sand backwardly along the trough.

In order to advance the material and still drain it effectively, the trough is arranged to vibrate or oscillate slightly in a direction endwise of the drum and trough. Suitable supporting means for this purpose are provided, and in the form illustrated, comprise a plurality of links 28 which are of equal length and which are arranged parallel to each other. These links are connected at their upper ends by pivots 29 and to the trough 26. They are connected by like pivots 30 at their lower ends to the sills 25. All of the links 28 are parallel to each other and preferably are spaced equidistantly from each other. Each link slopes from its point of connection with the trough downwardly forwardly of the trough in the conveying direction.

As a result of this arrangement, as the trough is pushed forwardly or in the conveying direction, it orbits in an upwardly convex path, moving upwardly and forwardly concurrently. On the other hand, as it returns it follows a like path downwardly and rearwardly. The trough is vibrated or oscillated along its path very rapidly. This throws the sand upwardly and forwardly, freeing it from the bottom of the trough 26 and loosening it. It falls back onto the trough in loose condition while still travelling forwardly, and so settles out of the residual water, all as more fully explained in my copending application.

To assure that the residual water does not filter downwardly through the sand, the trough 26 has an imperforate bottom wall 32 which, as mentioned, has a general slope upwardly from the inlet end of the trough to the upper or discharge end. This bottom wall is made up of a plurality of separate imperforate portions, indicated at 32a, each of which slopes endwise upwardly toward the discharge end of the trough at an angle slightly greater than the general slope of the trough 26. Each of these portions 32a is arranged so that its upper end 33 is at or beyond the lower end 34 of the next succeeding portion 32a in a direction toward the discharge end of the trough. Thus, after the sand is moved along a portion 32a for a certain distance, it then tumbles off of the end thereof and thereby is further loosened, and falls onto the imperforate succeeding portion.

Suitable passage means are provided at or adjacent the ends 33 and 34 for draining away the residual water. The passage means are provided by spacing the upper ends 33 of each portion 32a a distance above the adjacent lower end of the next succeeding portion 32a, and leaving the space between the ends unobstructed so as to provide passages 35. These passages are substantially coextensive in width with the trough and the freed residual water can flow off the top of the material and escape through them readily. As mentioned, the wall portions 32a are imperforate so that the water must flow off of the top of the material to be discharged from the trough and cannot filter down through the material and penetrate the trough bottom wall.

Figure 1:
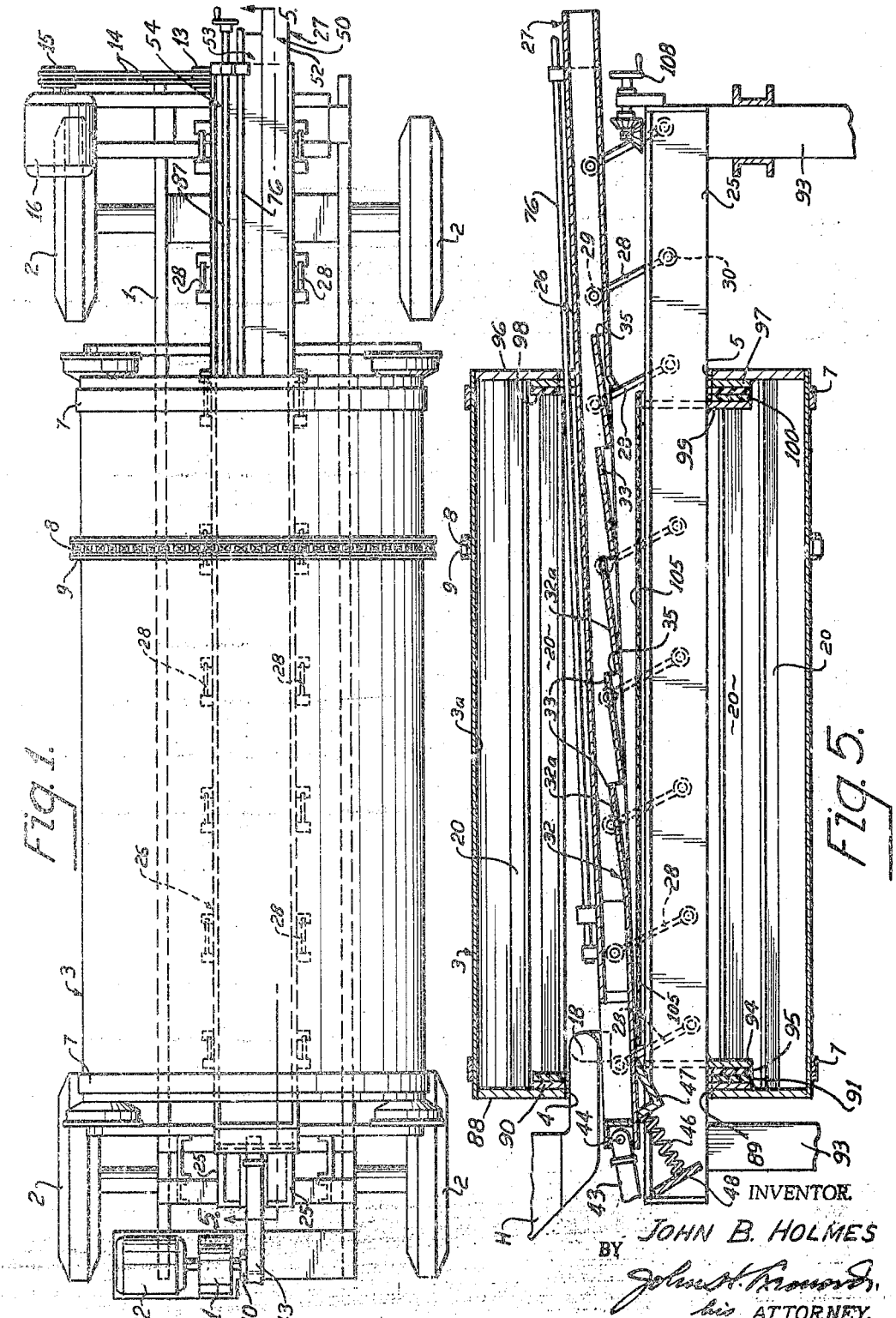
FIG. 1 is a top plan view of the apparatus embodying the principles of the present invention.
Figure 2:
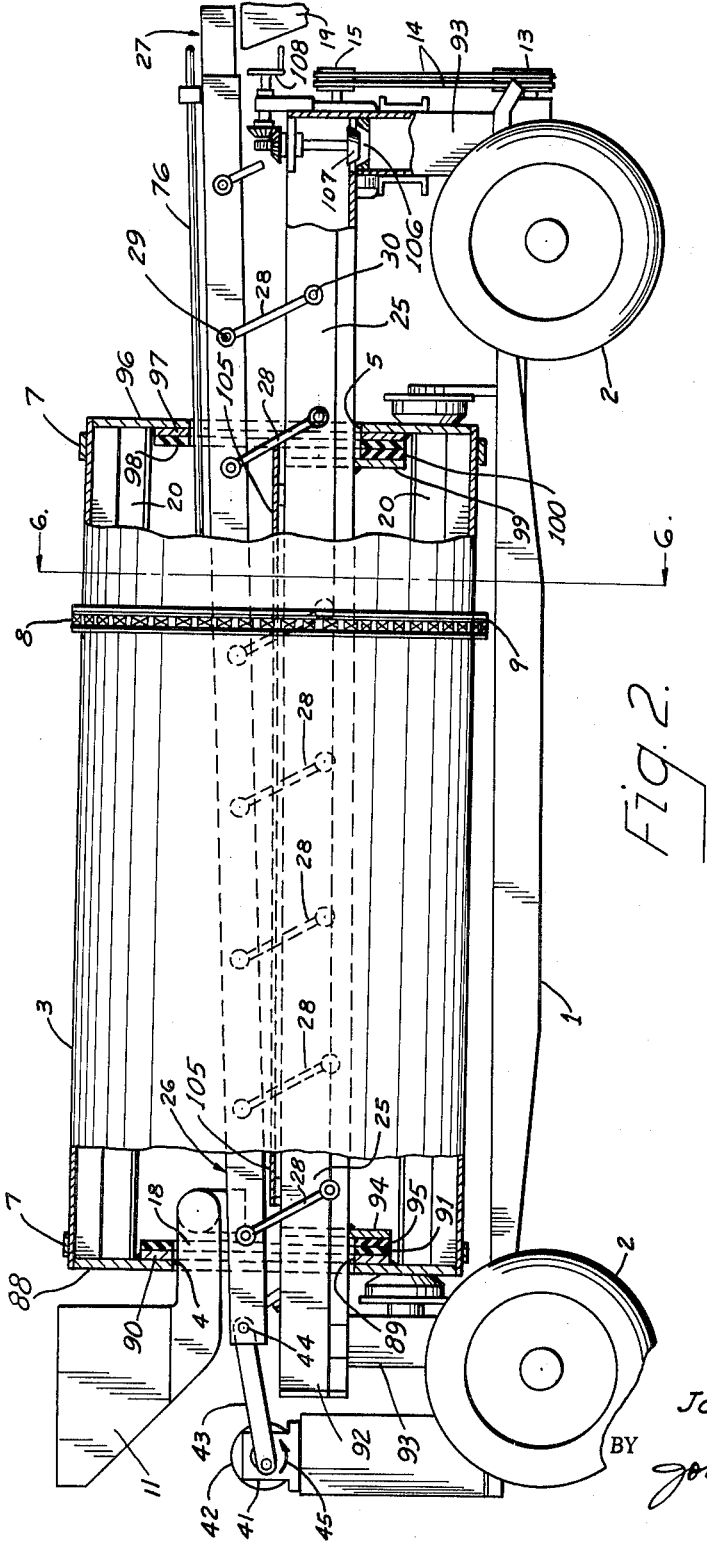
FIG. 2 is a front elevation of the apparatus illustrated in FIG. 1.
Figure 3:
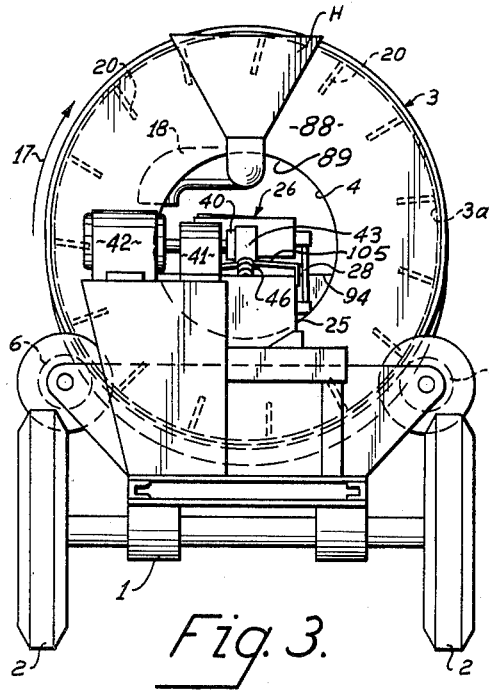
FIGS. 3 and 4 are left-hand and right-hand elevations, respectively, of the apparatus illustrated in FIG. 2.

In order to vibrate or orbit the trough, a suitable eccentric drive 40 is provided. The eccentric drive is driven through suitable reduction gearing 41 by an electric or other motor 42. A connecting rod 43 is pivotally connected at one end to the eccentric drive 40, and pivotally connected at the other end, as indicated at 44, to the trough 26 so that upon rotation of the eccentric the trough will be vibrated. The axis of the eccentric shaft is normally spaced below the level of the axis of the pivot 44 and the eccentric drive is in the direction indicated by the arrow 45 in FIG. 2. As a result of this arrangement, a substantial component of the rotational movement of the eccentric as it drives the trough forwardly is vertical. However, the eccentric axis is close to the level of the axis 44, so that a larger component of its rotational movement, as the eccentric moves to return the trough, is horizontal. Therefore, the trough is moved forwardly gradually and returned rapidly. As a result, the sand is transported and moves with the trough forwardly, but as the trough is returned, it is suddenly pulled out from beneath the sand so that the sand is suddenly dropped and falls through the air back onto the bottom wall at an advanced position along the trough, only to be almost immediately lifted and thrown forward again, or struck by other sand already rising from the bottom wall.

As a result, the sand is successively loosened and compacted so that the residual water is brought to the upper surface. This water flows over the top surface of the sand and downwardly and outwardly through the passages 35 and back into the drum.

Due to the inertia of relatively heavy moving parts, a suitable compression spring 46 is provided between an abutment 47 on the feed end of the trough 26 and a suitable stationary abutment 48 on the frame. This spring preferably slopes upwardly about 30° to the horizontal in a direction toward the discharge end of the trough. As the trough returns, it is lighter because part of the sand and water has been discharged. Thus, as the trough is returned rapidly, the spring is compressed so that toward the end of the return movement of the trough, the spring has absorbed the inertial stresses, brought the trough to a rest, and stored energy for restarting and urging the trough in the opposite direction, thus reducing the stresses to which the apparatus otherwise would be subjected.

Generally, the slope of the trough is about that shown in the drawing, but it may be varied, as described in my copending application.

It is noted in operation that coarser particles tend to settle out of the water quickly and to be picked up and discharged nearer to the input end of the drum by the buckets or paddles. These coarse particles fall off readily onto the conveyor as the buckets approach the position directly above the conveyor. However, the finer particles tend to pack between the buckets and drum wall and adhere to the walls and not discharge as readily. Quite often this continues until substantial amounts of the fine particles accumulate in the buckets. Furthermore, the finer sand particles wash down toward the discharge end of the drum as a result of remaining longer suspended in the water of the drum which is flowing continuously toward the discharge end. As a result of both of these factors, larger amounts of the fine sand are discharged from the buckets near the discharge end of the drum. Thus, there is a partial separation of the fine from the coarse particles.

To take advantage of these phenomena when grading of the material is desired concurrently with the conveyance and separation or dehydration, the applicant provides deflectors in the trough 26. These deflectors, indicated generally at 50 and 51, divide the trough into a plurality of segregated trough portions 52, 53, and 54, respectively, which are arranged side by side and extend lengthwise of the trough.

The deflector 50 comprises an inverted channel having a top wall 55 and side walls 56 and 57 which may rest on the bottom wall of the trough and be secured in fixed position endwise by welding or otherwise. The deflector 50 extends from the discharge end of the trough partway toward the receiving end of the trough. It terminates in spaced relation to the receiving end in a lateral flexible deflecting wall 58. The deflecting wall 58 extends from the wall 57 to the side wall 59 of the trough 26 so that all material falling onto the trough between the receiving end of the trough 26 and the wall 58 is directed along the trough into the open or receiving end of the trough portion 52.

Correspondingly, the deflector 51 has a top wall 61 and side walls 62 and 63 which may rest upon the bottom wall of the trough. The deflector 51 is secured in fixed position endwise of the trough. The deflector 51 has a lateral flexible deflecting wall 64 at the receiving end of the trough portion 53. The wall extends transversely of the trough from the wall 63 to the wall 59 of the trough. As a result, all material falling into the trough 26 between the wall 58 and the wall 64, is directed into the open receiving end of the trough portion 53. The trough portion 54 is uncovered. The top walls 55 and 61 slope downwardly transversely of the trough 26 toward the trough portion 54 and form a continuous planar cover so that material falling on either top wall moves transversely of the trough and falls into the nearest uncovered one of the trough portions 53 and 54.

By adjusting the flexible deflecting walls of the deflectors endwise of the trough, different gradations of the material as to size can be obtained. Usually, moving the flexible walls toward the inlet end of the drum, which is to the left in FIG. 5, increases the coarseness of the material received in trough portions 53 and 54. Moving them to the right in FIG. 5 tends to permit progressively less coarse material to enter. This is because the material discharged onto the trough by the drum usually is coarsest at the inlet end of the drum or trough and finest at the discharge end of the drum, there being a progressive gradation from one end of the drum toward the other.

It is to be noted, as shown in FIG. 8, for example, that the bottom edges of the walls 56, 57, 62, and 63 engage the upper edges of the sloping bottom wall portions 32 of the trough 26. Accordingly, the bottom edges of the walls 56, 57, and 62 are serrated to fit the upper faces of the portions 32a so that each trough portion is isolated from the others.

It is to be noted also that the number of deflectors and resultant trough portions used depends upon the fineness of gradation desired. The more deflectors, each having its inlet or feeding space at a different position along the length of the trough, the more precise is the degree of gradation.

As mentioned, by adjusting the flexible deflecting walls 58 and 64 endwise of the trough, different gradations of material as to size can be obtained. Means are provided to adjust the walls to the desired position and to lock them in position. Since the adjusting means for the walls 58 and 64, and the walls themselves, are essentially the same, the wall 58 only will be described in detail.

The wall 58 is preferably in the form of a flexible strip of imperforate material, a piece of ordinary heavy duty woven power transmission belting, or the like, being suitable. The trough, at the position at which the walls 58 and 64 are located, has a flat planar bottom wall, as indicated at 65. The wall 58 is disposed with its bottom edge against this bottom wall 65, and extends upwardly near to the top of the trough. The wall 58 is connected at one end to the wall 59 by a suitable means such as rivets 66. It is connected at its other end to the wall 57 by suitable rivets 67. The wall 57 terminates endwise of the trough, closer to the discharge end of the trough than the point of connection of the wall 58 with the wall 59 by the rivets 66. It is desirable that the wall 58 be arranged so that it can be moved along the trough to different locations and then secured in place at the location selected so that it slopes from the wall 59 inwardly toward the wall 57.

For this purpose, the length of the strip between the points of connection 66 and 67 is longer than the straight path between these points, thus allowing substantial slack in the strip when it is being adjusted. Expanding bars 69 and 70 are provided for positioning the strip and tensioning a portion thereof extending from the planes of the wall 59 to the plane of the wall 57. The expanding bar 70 has its ends received in, and slidable along, suitable trackways 71, arranged one along the wall 59 and one extending away from the discharge end of the trough and forming a continuation of the plane of the wall 57. These trackways are disposed near the top of the trough and slidably accommodate the bar 70 for movement endwise of the trough. The bar 69 is provided at its ends with dependent rounded pins 72 and 73, respectively. The pin 72 engages the wall 58 at the side facing away from the discharge end of the trough. The pin 73 engages the face of the wall 58 facing toward the discharge end of the trough. These pins are preferably coextensive in height with the wall 58. The bars 69 and 70 are pivotally connected by a common upright pivot 74 to a yoke 75. An operating rod 76 extends lengthwise of the trough and the yoke 75 is connected to the inner end of the rod for swivelling about the horizontal axis of the rod. The rod is threaded along a portion of its length near the yoke 75, as indicated at 77, and a follower 78 is threaded thereon. The follower is pivotally connected to one end of a link 79 and to one end of a link 80. The opposite end of the link 79 is pivotally connected to the bar 69 and the opposite end of the link 80 is pivotally connected to the bar 70. Thus, by rotating the rod 76 in one direction, the follower is moved to the right in FIG. 9, thus rocking the bars about the pivot 74 so that the overall width of the arm assemblage is less than the distance between the trackways 71. This releases the arm 70 from the trackways and loosens the pressure of the arm 69 on the wall 58. In this condition, by pulling the rod endwise, the bars 69 and 70 can be moved endwise of the trough, thus moving the flexible partition wall 58 to different adjusted locations along the trough. By rotating the rod 76 in the opposite direction while the bars 69 and 70 are in the newly selected location, they can be made to firmly engage the faces of the wall 58 and the trackways 71, respectively, and firmly hold that portion of the wall 58 between the rods 72 and 73 in a position in which it extends from the plane of the wall 59 to the plane of the wall 57. In this manner the total area of the top opening for receiving the materials which are to pass into the trough portion 52 can be increased or decreased while the machine is operating. The rod 76 extends entirely through the trough and is provided near the discharge end of the trough with a hand wheel 81, so that the adjustment can be made by one who is observing the material being discharged.

The rod 76 may be mounted for sliding movement axially in any suitable bracket 82 at the discharge end of the trough. The wall 64 is manipulated in a like manner by cross bars 83 and 84 operated by links 85 and 86 by the rod 87 and its hand wheel 88.

It is to be noted that the partition wall 63 between the trough portions 53 and 54 likewise terminates nearer the discharge end of the trough, as indicated at 63a, than its point of connection at 90 with the wall 59. The cross bars in both instances are preferably arranged so that the walls 58 and 64 extend on a bias to the length of the trough, sloping from their connection with the wall 59 toward the discharge end of the trough, as they approach the planes of the walls 57 and 63, respectively.

Referring next to the manner of controlling the amount of fines discharged with the wash water, a special discharge conduit is provided. Ordinarily, in the equipment thus far described, the velocity of flow of wash water out of the drum would tend to increase as the water approaches the discharge end of the drum. This would be due to the restricted passage through which all of the water would have to pass. This increase in velocity of the water travelling endwise of the drum from the inlet end to the discharge end would extend back an appreciable distance from the discharge end of the drum and would tend to form a rather higher speed stream extending longitudinally along the midportion of the body of water in the drum. The velocity would be sufficient to carry out of the drum a large number of fines in the half of the drum nearest the discharge end and which would otherwise remain in the drum if the velocity of flow of the discharged water at the outlet of the drum were less pronounced.

In order to eliminate this concentrated flow and to make the flow more uniform and at lower velocity at all points along the length of the drum, suitable control means, now to be described, are provided.

At the inlet end of the drum, the drum has an end wall 88 with an inlet passage 89. An annular steel plate 90, having affixed to one face thereof a rubber annlus 91, is secured to the wall 88 for rotation therewith with the rubber annulus facing inwardly of the drum and in coaxial relation to the inlet passage 89. Extending through the drum is a suitable stationary gutter 92 which is supported at its ends in fixed position on suitable supports 93. Mounted in fixed position on the gutter is a steel plate 94 having affixed to its outer face a semi-annular rubber sheet 95. This plate 94, and also the end portions of the semi-annular rubber sheet 95 extend upwardly to a level of the top of the gutter 92 which usually is near to the level of the axis of the drum. The sheet 95 engages the sheet 91 in sliding contact and forms a seal therewith. The plate 94 together with the sheets 91 and 95 thereby form a dam so that all of the water passing out of the drum must rise to a level of the top of the sheet 95, which is also the top of the gutter 92. A similar arrangement is provided at the opposite end wherein the drum has a discharge end wall 96. Connected in fixed position to the wall 96 for rotation therewith is a metal annular plate 97 on the inner face of which is affixed an annular sheet 98. A metal plate 99, having a semi-annular rubber sheet 100 affixed to its outer face, is secured on the gutter 92 and likewise extends upwardly to the top of the gutter or to a level substantially at the axis of the drum. The sheets 98 and 100 slidably engage and with the plate 99 form a dam at the inlet end of the drum.

As best illustrated in FIG. 6, the gutter 92 is in two portions 101 and 102 which are held in spaced relation to each other laterally of the drum so that water can rise therebetween. Thus the water can reach both upper edges of each trough portion. The trough portions may have small marginal flanges 103 at their upper edges, but all of their upper edges lie in the same horizontal plane. These edges are of greater total length than the length of the gutters and preferably are coextensive with the length of the drum.

With this arrangement, the water in the drum can rise to the upper edges of the gutter, passing over the outer upper edges thereof and up through the space 104 between the portions 102 and 103 and thence overflowing the inner upper edges. Thus, instead of having a very short discharge edge over which the water is to flow as heretofore, the discharge edge is one which is equal to four times the length of the drum itself. Consequently, with the same volume of discharge of water as heretofore used, there is only a very low velocity of flow of a very thin sheet coextensive with the top edges of the gutter portions. The velocity of flow across the top edges, therefore, is very slow at each point along their length.

As a result, there is no well defined current of increasing velocity as the point of discharge of water from the drum is approached, but a gradual drainage along the entire length of the drum. The fines are not carried out with the slowly flowing wash water to so great an extent as would be the case were it permitted to flow directly out of an opening in the end wall. Since they remain longer in the drum, more are dumped with the sand onto the conveyor.

A suitable deflecting guard or shield 105 may be provided on the gutter in spaced relation above its open top and upper edges so as to prevent the water poured by the buckets from falling directly into the gutter.

The guard 105 may be placed very close to the top edges of the gutter so as to limit access of the water to the trough over the edges due to the churning of the water in the drum and to maintain the depth of the water across the edges relatively constant throughout the length of the gutter portions 101 and 102. The dams may be extended to a length farther above the gutter edges, thus providing a deeper flow over their edges, depending upon the proportion of fines to be retained. This can be accomplished by merely shimming up the gutter or adding an additional strip to the top of the sheets 91 and 100. The gutter portions preferably are closed at the inlet end of the drum and are open, as indicated at 106, at the discharge end so that the water can drain outwardly and discharge from the gutter into a suitable sump. The support 93 may be made hollow and the water permitted to drain through it as a downspout.

If further control of the fines is required, suitable damper valves 107 may be provided at the discharge end of the gutter portions and adjusted by hand wheel 108 to change the rate of discharge of water from the gutter. By allowing the gutter to fill to overflowing and remain overflowed while the water drains slowly from the gutter, the rate of migration of the fines into the gutter can be further retarded.

Referring next to FIG. 11, a modification is illustrated wherein the gutter is arranged to reduce the entrance into the gutter and escape of finer material and thereby distribute the finer material more uniformly throughout the final product. This structure is essentially the same as that shown in FIG. 6, including the drum 110, corresponding to the drum 3, the trough 111 corresponding to the trough 26, and a gutter 112 corresponding generally to the gutter 102. The only difference is in the gutter 112. The gutter 112 is in the form of three channels, 112a, 112b, and 112c. It is entirely closed at its sides by a cover 113, which may be integral with the outer walls of the channels 112a and 112c. Thus, surface water in the drum cannot flow directly over the outer walls of channels 112a and 112c. Instead all water entering the channels must flow downwardly to the bottom of the gutter 112, then rise between the channels so as to flow over the inner walls of the channels 112a and 112c and both walls of channels 112b. As a result, fines and other particles falling into the churning surface water cannot be splashed and washed directly over the upper edges of the walls of the gutter. Instead, they must first pass downwardly with the downward flowing water, pass around the outside of the gutter, then reverse in direction and rise between the channels. This provides a longer and slower flow for the water and affords the material an opportunity to settle back into the bottom of the drum. Thus, less material is carried by the water into the gutter, and more settles into the mass in the drum and is carried up and discharged into the converging and separating trough 111.

It is seen that different degrees of separation of the water and gradation of the sand can be obtained by changing the length and width of the inlets of the portions of the trough, whether such portions are provided by using deflectors or by using a plurality of supplemental trough portions of different lengths placed one above the other. Also, different effects can be obtained by changing the height of the upper edges of the gutters relative to the water level in the drum, and the spacing of the diversion shield relative to the top edges of the gutters.

It has been found that with these arrangements, the amount of fines to be retained can be accurately controlled within desirable limits for various commercial and industrial requirements.

In the foregoing description, the invention has been described in relation to the separation of bank run sand and gravel from water. However, it is to be understood that it applies also to the separation of various types of solid, granular materials from liquids. For example, in the so-called heavy media methods of separation, the heavier iron ore is to be separated from the liquid in which it is suspended and the principles of the present invention are applicable thereto.

Having thus described my invention, I claim:

1. An apparatus for washing, conveying, and removing the washing liquid from loose material and comprising a power driven, generally horizontal, rotary drum having an imperforate peripheral wall, means for continuously admitting loose material and liquid into the drum, buckets carried by the drum and rotatable therewith for hoisting the mixture of liquid and loose material upwardly at one side of the drum and for pouring off free liquid, accumulated on top of the material settling out in the buckets during their rise, as the buckets approach the upper portion of their path of rotational movement with the drum, and for discharging the mixture of loose material and residual liquid further along the upper portion of the path of the buckets, material conveying means in the drum and having a material supporting portion with an opening at the top positioned to receive the loose material and residual liquid discharged from the buckets, said conveying means having an end portion extending out of one end of the drum, said end portion having a discharge passage outside of the drum, said material supporting portion being arranged for conveying the received material to, and discharging it through, said discharge passage, elongated stationary conduit means in the drum extending endwise of the drum, and having an imperforate bottom portion, said conduit means having an outlet disposed for discharging outside of the drum, and having, above its bottom portion, edges which are spaced below the material supporting portion and over which liquid in the drum at a predetermined level, which is above the level of said edges and below said supporting portion, can flow into the conduit means, and means for maintaining the surface level of liquid in said drum at said predetermined level.

2. The structure according to claim 1 wherein the conduit means are elongated gutter means which are open to the top for at least a major portion of the length of the drum, and said edges are the top edges of those portions of the gutter means which are within the drum, and said edges are substantially horizontal.

3. The structure according to claim 2 wherein the gutter means in the drum are a plurality of separate gutters in side by side spaced relation to each other so that liquid in the drum can flow upwardly between the gutters and over both edges of each gutter.

4. The structure according to claim 2 wherein the said top edges are below, but very close to, said predetermined level, whereby the liquid is constrained to flow over said top edges in thin sheet form.

5. The structure according to claim 1, wherein the material supporting portion of the conveying means comprises a trough having two spaced lateral walls, an adjustable end wall comprising a flexible strip of material connected to one lateral wall at one location and to the other lateral wall at a location spaced endwise of the other wall from said one location, and said strip being of greater length than the distance between the locations, a pair of floating cross bar devices pivoted to each other between their ends, fixed track means parallel to said lateral walls and normally slidably receiving the ends of one bar, means on one end of the other bar slidably engaging one face of the flexible wall near the plane of one lateral wall, means on the other end of said other bar slidably engaging the other face of the flexible wall near the plane of the other lateral wall, means for rocking the bars relative to each other to a predetermined rocked position wherein said one bar wedges firmly into fixed relation to the track means, and the other bar into position to draw a portion of the flexible wall across the trough from one lateral wall to the other, at different locations along the track means, means to secure the bars in said predetermined rocked position and to release them from said predetermined rocked position, selectively, and means to shift the bars, when released, bodily endwise of the lateral walls, to other preselected locations along the track means.

6. An apparatus for washing, conveying, and removing the washing liquid from loose material and comprising a power driven, generally horizontal, rotary drum, means for continuously supplying liquid and loose material into the drum, said drum having an imperforate peripheral wall, buckets carried by the drum and rotatable therewith for hoisting a mixture of the liquid and the loose material upwardly at one side of the drum and for pouring off freed liquid, accumulated on top of the material settling out in the buckets during their rise, as they approach the upper portion of their path of rotational movement with the drum, and for discharging the mixture of loose materials and residual liquid further along the upper portion of their path, combined material conveying and residual liquid separating means in the drum and having a material supporting portion with an opening at the top positioned to receive the loose material and residual liquid discharged from the buckets, said means having an end portion extending out of one end of the drum with a discharge passage therein discharging outside the drum, said material supporting portion being arranged for conveying the material received from the drum to, and discharging it through, said discharge passage, said supporting portion having discharge passages for discharging the separated residual liquid back into the drum, stationary gutter means in the drum and extending out of one end thereof, said gutter means having a discharge passage outside the drum and having substantially horizontal top edges which are spaced below the material supporting portion and spaced apart from each other laterally of the gutter means, at least for the major portion of the length of the gutter means within the drum, and over which liquid in the drum at a predetermined level, which is above the edges and below said supporting portion, can flow into the gutter means, and means for maintaining the surface level of liquid in said drum at said predetermined level.

7. The structure according to claim 6 wherein the gutter means comprising a plurality of gutters spaced laterally from each other, each gutter has two top edges at its opposite sides, the adjacent top edges of adjacent gutters also being spaced apart laterally of the gutters, so that liquid can flow from the drum into the open top of each gutter over both lateral edges defining its open top.

8. An apparatus for washing, conveying, and removing the washing liquid from loose material and comprising a power driven, generally horizontal, rotary drum having an imperforate peripheral wall, means for continuously supplying liquid and loose material into the drum, buckets carried by the drum and rotatable therewith for hoisting the mixture of liquid and loose material upwardly at one side of the drum and for pouring off freed liquid, accumulated on top of the material settling out in the buckets during their rise, as they approach the upper portion of their path of rotational movement with the drum, and for discharging the mixture of loose materials and residual liquid further along the upper portion of their path, material conveying means in the drum and having an opening at the top positioned to receive the loose material and residual liquid discharged from the buckets, said conveying means having a material supporting portion and having an end portion extending out of one end of the drum, said end portion having a discharge passage outside of the drum, said conveying means being arranged for conveying the received material to, and for discharging material through, said discharge passage, said drum having an overflow outlet at one end, a stationary gutter extending through the outlet and into and lengthwise of the drum, dam means cooperable with the drum and gutter to prevent discharge of liquid from the drum around the exterior of the gutter and for maintaining the surface level of liquid in the drum at a predetermined level, said gutter having, below said supporting portion, passage defining edges along its length above its bottom, and below, but close to, the said predetermined level over which liquid at said predetermined level can flow into the gutter, said gutter being imperforate at its lower portion.

9. The structure according to claim 8 and further including shield means in overlying spaced relation above said defining edges for deflecting such liquid and material as may fall from the supporting portion away from said edges while permitting liquid in the drum below the shield means to flow over said edges into the gutter.

10. An apparatus for washing, conveying, and removing the washing liquid from loose material and comprising a power driven, generally horizontal, rotary drum having an imperforate peripheral wall, means for continuously supplying liquid and loose material into the drum, buckets carried by the drum and rotatable therewith for hoisting the mixture of liquid and loose material upwardly at one side of the drum and for pouring off freed liquid, accumulated on top of the material settling out in the buckets during their rise, as they approach the upper portion of their path of rotational movement with the drum, and for discharging the mixture of loose materials and residual liquid further along the upper portion of their path, material conveying means in the drum and having an opening at the top positioned to receive the loose material and residual liquid discharged from the buckets, said conveying means having a material supporting portion and having an end portion extending out of one end of the drum, said end portion having a discharge passage outside of the drum, said conveying means being arranged for conveying the received material to, and for discharging material through, said discharge passage, said drum having an overflow outlet at one end, said supporting portion being a material conveying vibratory power driven conveyor in the drum extending lengthwise thereof, said conveyor having spaced side walls and at least one partition wall extending endwise of the conveyor and dividing it into a plurality of separate troughs arranged side by side, said partition wall having an inner end terminating a lesser distance from the discharge end of the conveyor than one of the side walls, a flexible deflecting wall between said one side wall of the conveyor and said partition wall, and connected to the partition wall nearer said inner end and to the side wall at a location farther from the discharge end than is said inner end, said flexible wall being greater in length than the distance between its points of connection to said walls, means engaging the flexible wall, means for positioning a portion of the flexible wall intermediate its ends endwise across the space between the planes of said one side wall and said partition wall at different preselected positions, respectively, along the conveyor, and means for securing the flexible wall in the preselected positions along the conveyor.

11. In a trough structure including two spaced lateral walls, an adjustable end wall comprising a flexible strip of material connected to one lateral wall at one location and to the other lateral wall at a location spaced endwise of the other wall from said one location, and said strip being of greater length than the distance between the locations, a pair of floating cross bar devices pivoted to each other between their ends, fixed track means parallel to said lateral walls and normally slidably receiving the ends of one bar, means on one end of the other bar slidably engaging one face of the flexible wall near the plane of one lateral wall, means on the other end of said other bar slidably engaging the other face of the flexible wall near the plane of the other lateral wall, means for rocking the bars relative to each other to a predetermined rocked position wherein said one bar wedges firmly into fixed relation to the track means, and the other bar into position to draw a portion of the flexible wall across the trough from one lateral wall to the other, at different locations along the track means, means to secure the bars in said predetermined rocked position and to release them from said predetermined rocked position, selectively, and means to shift the bars, when released, bodily endwise of the lateral walls, to other preselected locations along the track means.

References Cited by the Examiner
UNITED STATES PATENTS

| | | | |
|---|---|---|---|
| 973,363 | 10/1910 | Major | 209—452 |
| 3,042,208 | 7/1962 | Holmes | 209—452 |

HARRY B. THORNTON, *Primary Examiner.*
FRANK W. LUTTER, *Examiner.*